United States Patent [19]
Mimura

[11] Patent Number: 5,930,242
[45] Date of Patent: Jul. 27, 1999

[54] TRANSMITTING POWER CONTROL METHOD AND APPARATUS

[75] Inventor: Yukie Mimura, Tokyo, Japan

[73] Assignee: NEC Corporation, Tokyo, Japan

[21] Appl. No.: 08/782,669

[22] Filed: Jan. 15, 1997

[30] Foreign Application Priority Data

Jan. 19, 1996 [JP] Japan ................................. 8-007263

[51] Int. Cl.$^6$ ............................................. H04Q 7/00
[52] U.S. Cl. ........................................ 370/331; 455/126
[58] Field of Search ................................ 370/331, 332, 370/333; 375/200; 455/436, 437, 438, 442, 69, 70, 522, 517, 126

[56] References Cited

U.S. PATENT DOCUMENTS

| | | | |
|---|---|---|---|
| 5,245,629 | 9/1993 | Hall | 375/1 |
| 5,386,589 | 1/1995 | Kanai | 455/33.1 |
| 5,640,414 | 6/1997 | Blakeney, II et al. | 375/200 |
| 5,715,526 | 2/1998 | Weaver, Jr. et al. | 455/126 |

OTHER PUBLICATIONS

"An Introduction to CDMA Technology"; Qualcomm CDMA Seminar, Oct. 19–20, 1995, p. 21.

Primary Examiner—Chi H. Pham
Assistant Examiner—Kim T. Nguyen
Attorney, Agent, or Firm—McGinn & Gibb, P.C.

[57] ABSTRACT

A total transmitting power of a base station calculated in a total transmitting power monitor is compared with a predetermined value in a comparator. When the total transmitting power is detected to exceed a first predetermined value, the transmitting power of a pilot signal transmitted by the base station is decreased by a pilot signal transmitting power controller. As a result, a forward channel can be assigned the transmitting power even when the number of mobile stations increases. Further, a priority for disconnection of the channel may be discriminated depending upon a characteristic of the mobile station, and the channel may be disconnected based on the comparing step and the discriminating priority step.

34 Claims, 8 Drawing Sheets

TRANSMITTING POWER CONTROL METHOD AND APPARATUS

BACKGROUND OF THE INVENTION

The present invention generally relates to a transmitting power control method and apparatus, and more particularly to a transmitting power control method and apparatus in a mobile communication system utilizing a Code-Division-Multiple-Access (CDMA) system.

DESCRIPTION OF THE RELATED ART

Code-Division-Multiple-Access (CDMA) communication is widely used in mobile communication systems. CDMA refers to a type of radio communication using a spread-spectrum technique.

In operation, a transmitter modulates data to be transmitted over a radio frequency (RF) link with a spreading code. In order to recover the data, the receiver must de-spread the received signal by using the same spreading code as used by the transmitter.

Spreading codes comprise strings of bits (typically referred to as "chips") which are multiplied with the data bits prior to transmission. Various spreading codes are known such as, for example, Maximum Length Code or Maximum Length Sequence series, sometimes referred to simply as "M" as well as "Gold code series".

Thus, in a CDMA system, communication is performed by spreading (e.g., diffusing), on the transmitting side, a bandwidth of a signal with a diffusion code having a high speed transmission rate and recovering, on the receiving side, the original information bandwidth through inverse diffusion using the same diffusion code. This system assures simultaneous communications by a plurality of users within the same frequency band because an orthogonal diffusion code is assigned to each user.

In a cellular-type mobile communication system, as shown in FIG. 9, a mobile station switches a base station, as a communication object, while traveling through the communication regions (e.g., cells) of a plurality of base stations. Since the adjacent base stations use the same frequency in the cellular system introducing the CDMA system at the time of switching (e.g., typically referred to as a "hand-off") of the base station as the communication object, simultaneous communication with the current base station and the base station to be switched is achieved. The hand-off system for realizing communication with a plurality of base stations without any break in communication is called a "soft hand-off" and is preferable.

In a cellular system in a CDMA system using a pilot signal, a mobile station selects, as a communication object, a base station having a large desired receiving wave power vs. noise power ratio (including the interference wave) of the pilot signal transmitted continuously from the base station. Moreover, when this value of the base station under communication becomes lower than the predetermined reference value, the mobile station terminates communication.

The desired receiving wave power vs. noise power of the pilot signal which is the reference value for selecting the base station as the communication object during such communication is called a "hand-off parameter". The hand-off parameter includes the reference value (T_DROP) for suspending communication with the base station as the current communication object and the reference value (T_ADD) for newly starting communication with a base station.

Moreover, in the cellular system utilizing the CDMA system, when all mobile stations under communication transmit a signal of equal transmitting power to the base station, a problem arises in that the interference receiving power from the unwanted (but closer) mobile stations is higher than the receiving power from the desired (but more remote) mobile station.

Therefore, a method of controlling the transmitting power from each mobile station is often used so that the base station will receive equally-powered signals from the mobile stations. In this operation, the base station directs mobile stations to send a signal having a certain level. The mobile stations typically vary their power output depending upon the strength of the signal received from the mobile station. Additionally, for a "forward channel" (e.g., a channel used for communication in the direction from the base station to the mobile stations), the transmitting power of the base station is controlled so that the desired receiving wave power vs. noise power ratio at each mobile station is equalized.

In other words, the power of channels (signals) which are transmitted to mobile stations having a lower wave power vs. noise power ratio (i.e., more distant mobile stations) are increased to allow those more distant mobile stations to receive the same wave power vs. noise power ratio as closer mobile stations.

An example of the conventional transmitting power control method is described in "AN INTRODUCTION TO CDMA TECHNOLOGY", QUALCOMM Inc. CDMA Seminar, Oct. 19–20, 1995. In this transmitting power control method, the mobile stations monitor the quality of the forward channel, while the base station controls its transmitting power based on the quality of the forward channel returning from the mobile stations. In this method, the independent transmitting power control is performed in the base station for each mobile station.

When the power control over the forward channel is performed in the base station, a problem develops in that the total transmitting power at the base station may reach a maximum transmitting power when the number of mobile stations increases. This may cause the receiving signal quality of the channel to deteriorate due to a shortage of transmitting power.

There is also a problem that the wave power vs. noise power ratio of mobile stations will change as the mobile stations move within a given cell. Indeed, there are a number of cases in which the ratio will change. For example, the ratio may change when the number of mobile stations increases, when the mobile stations move and fading is caused, and/or when shadowing arises. When the signal-to-noise ratio decreases because of these cases, the base station is required to transmit more power output. A shortage of transmitting power may result when these base stations increase their power output. Thus, these changing ratios may increase the power requirement beyond the capability of the base station. This is problematic.

SUMMARY OF THE INVENTION

In view of the foregoing problems of the conventional systems, it is therefore an object of the present invention to prevent deterioration of (and thereby maintain) receiving signal quality due to shortage of transmitting power by enabling allocation of the transmitting power to the forward channel even when the number of mobile stations increases.

According to a first aspect of the present invention, a method and apparatus is provided for controlling a transmitting power of a base station operated in a mobile communication system for implementing radio communication by utilizing a code-division-multiplexed communication channel between a base station and a mobile station and transmitting a code-division-multiplexed pilot signal by the base station. The method and apparatus include a monitoring step for monitoring a total transmitting power of the base station, a comparing step for comparing the total transmitting power as a result of monitoring in the monitoring step with a predetermined value, and a transmitting power control step for increasing or decreasing the transmitting power of the pilot signal based on the comparison result in this comparing step.

With the first transmitting power control method and apparatus, the total transmitting power is monitored and compared with the predetermined value. When the total transmitting power is detected to exceed the predetermined value as a result of comparison, the transmitting power of the pilot signal is reduced for the system utilizing the pilot signal. Thus, the transmitting power assigned to the communication channel can be increased.

Moreover, the number of mobile stations which terminate communication because the desired receiving wave power vs. noise power ratio (including the interference wave) of the pilot signal becomes lower than T_DROP increases among the mobile stations under communication with the relevant (respective) base station. Meanwhile, the number of mobile stations which start communication because the desired receiving wave power vs. noise power ratio (including the interference wave) of the pilot signal becomes higher than T_ADD increases among the mobile stations not under communication with the relevant base station. As explained above, since the number of mobile stations under communication with the relevant base station is reduced, the number of forward channels used decreases.

In a second aspect of the present invention, a method and apparatus for controlling a transmitting power of a base station operated in a mobile communication system for implementing radio communication by utilizing a code-division-multiplexed communication channel between a base station and a mobile station, includes a monitoring step for monitoring a total transmitting power of the base station, a comparing step for comparing the total transmitting power as a result of the monitoring step with a predetermined value, a priority discriminating step for discriminating priority for disconnection of the forward channel being used by the mobile station in the soft hand-off state, and a disconnection step for disconnecting the channel based on the comparison result in the comparing step and discrimination result in the priority discrimination step.

With the second transmitting power control method and apparatus, when the total transmitting power of the base station exceeds the predetermined value, the priority for disconnecting the channel used by the mobile station in the soft hand-off state is determined. Since the mobile station in the soft hand-off state is simultaneously communicating with two or more base stations, communication can be continued even when communication with one of the base stations is disconnected. A channel having a relatively lower receiving power in the mobile station is given the higher priority, and the channels are disconnected in the sequence of this priority. Thus, the number of forward channels used is decreased.

In a third aspect of the present invention, a method and apparatus for controlling a transmitting power of a base station operated in a mobile communication system for implementing radio communication by utilizing a code-division-multiplexed communication channel between a base station and a mobile station, includes a monitoring step for monitoring a total transmitting power of the base station, a comparing step for comparing the total transmitting power as a result of monitoring in the monitoring step with the predetermined value, and an access regulation discriminating step for discriminating whether access regulation is effectuated or not based on the comparison result in the comparing step.

With the third transmitting power control method and apparatus, when the total transmitting power of the base station exceeds the predetermined value, a new call is not accepted in this base station. Thus, an increase in the number of forward channels used can be controlled.

In a fourth aspect of the present invention, a method and apparatus for controlling a transmitting power of a base station operated in a mobile communication system for implementing radio communication by utilizing a code-division-multiplexed communication channel between a base station and a mobile station, includes a monitoring step for monitoring a total transmitting power of the base station, a comparing step for comparing the total transmitting power as a monitoring result in the monitoring step with a first predetermined value, and a transmitting power control step for adjusting a first reference value and a second reference value based on the comparison result in the comparing step.

If the total transmitting power is greater than the first predetermined value, the first and second reference values are increased. If the total transmitting power is less than the first predetermined value and is less than a second predetermined value, then the first and second reference values are decreased. If the total transmitting power is less than the first predetermined value and is larger than a second predetermined value, the first and second reference values of the hand-off parameter are not adjusted.

With the fourth transmitting power control method and apparatus, when the total transmitting power of the base station exceeds the predetermined value, the hand-off parameter is increased. When the T_ADD is increased, the number of mobile stations which select the base station as the communication object decreases. When the T_DROP is increased, the number of mobile stations which disconnect from (e.g., terminate) communication with the base station increases. Thus, the number of forward channels used is decreased.

Further, with the present invention, the total power transmission of the base station can be reduced.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
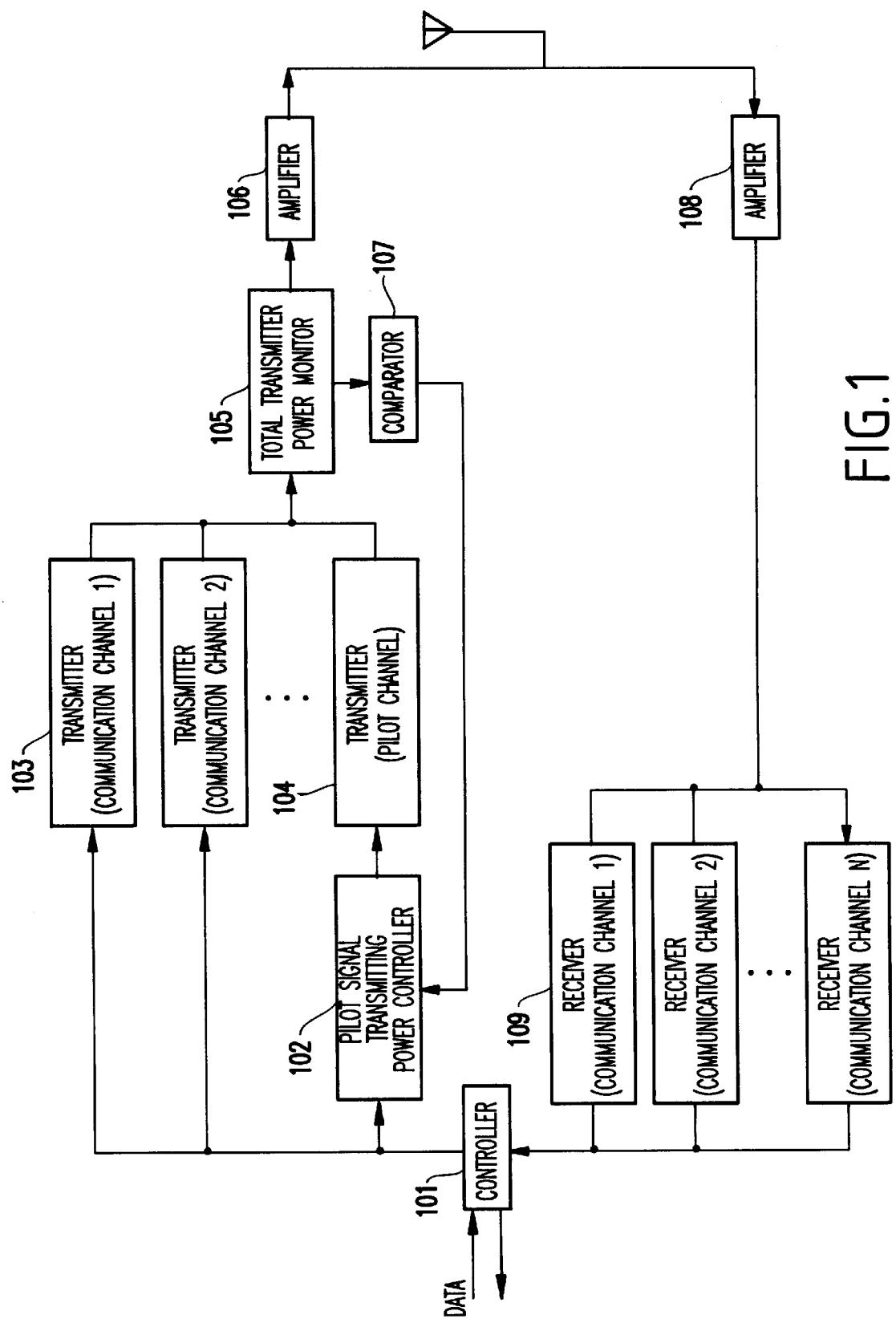
FIG. 1 is a block diagram of a base station to which the first embodiment of the transmitting power control method of the present invention is applied.

Referring now to the drawings, and more particularly to FIG. 1, there are shown preferred embodiments of the transmitting power control method and apparatus according to the present invention.

FIG. 1 is a block diagram of a base station to which the first embodiment of the transmitting power control method of the present invention is applied.

Data is input to and output from a controller 101. A signal from the controller 101 is inputted to a transmitter 103 for each communication channel and a pilot signal transmitting power controller 102. A result of controlling the transmitting power of the pilot signal in the pilot signal transmitting power controller 102 is inputted to a transmitter 104 for a pilot channel. The pilot signal is used by the mobile stations to determine the wave power vs. noise power ratio, discussed below for a given base station.

Signals from the transmitters 103, 104 are added together and supplied to a total transmitting power monitor 105. A signal is output from total transmitting power monitor 105 to an antenna (unreferenced) through an amplifier 106.

A comparator 107 compares the monitoring result from the total transmitting power monitor 105 with a first predetermined value or a second predetermined value, as will be explained below. The comparator 107 outputs the result of this comparison to the pilot signal transmitting power controller 102, and the controller 102 controls the transmitting power accordingly based on the comparison result.

On the receiving side, the received signal, obtained via the antenna (unreferenced) and amplified by amplifier 108, is inputted to a receiver 109 for each communication channel 1–N (where N is an integer).

Figure 2:
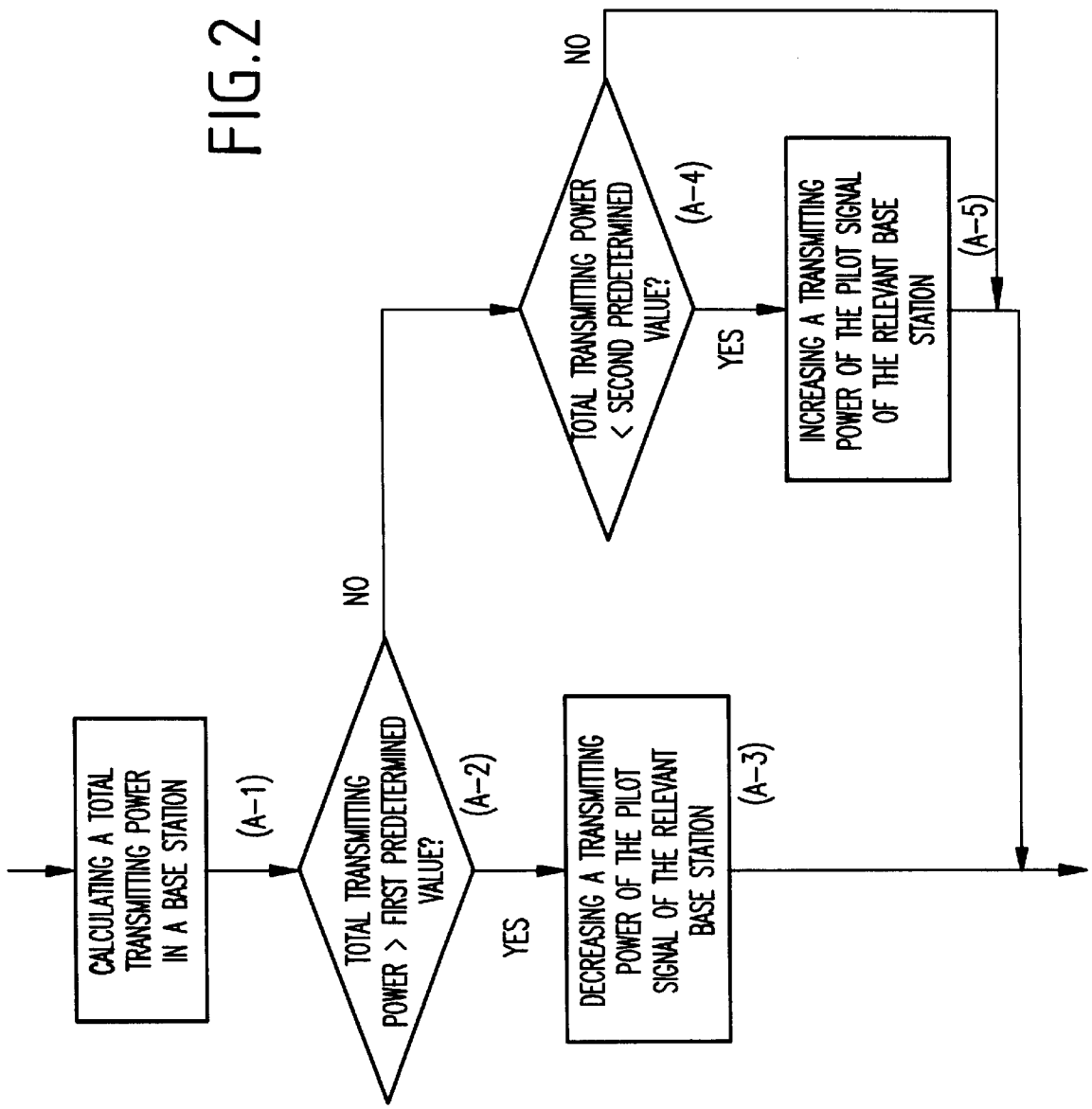
FIG. 2 is a flowchart of a first embodiment of the transmitting power control method according to the present invention.

The operation of the first embodiment is explained below with reference to the block diagram of FIG. 1 and the flowchart of the first embodiment of the transmitting power control method of the present invention as shown in FIG. 2.

First, in step A-1, a total transmitting power in a total transmitting power monitor 105 is calculated based on the sum of the outputs of all transmitters of the base station. Thereafter, a comparator 107 compares the calculation result with a first predetermined value (step A-2). For example, the first predetermined value may be close to the maximum power value of the base station (e.g., 80–90% of the maximum transmitting power of the base station). In an exemplary system, the first predetermined value may be 30 watts, which is less than the base station's maximum transmitting power.

When the total transmitting power is judged to exceed the first predetermined value, in step A-3 a signal for reducing the transmitting power assigned to the pilot signal of the relevant base station is supplied to a pilot signal transmitting power controller 102. Since the total transmitting power of the base station is reduced by reducing the transmitting power assigned to the pilot signal, the transmitting power assigned to the communication channel is increased.

A mobile station receives the pilot signal from each base station and determines, as the communication object, the base station of which Ec/Io (e.g., desired receiving wave power vs. noise power ratio) of the pilot signal received exceeds the reference value (T_ADD).

Therefore, the number of mobile stations which begin communication with the base station, which has reduced the transmitting power of the pilot signal, is reduced. Moreover, the mobile station which has started the communication terminates communication, when Ec/Io of the pilot signal from the base station under the communication does not exceed the reference value (T_DROP).

Therefore, the number of mobile stations, which terminate communication with the base station which has reduced the transmitting power of the pilot signal, increases. As a result, the number of forward channels used in the base station, which has reduced the transmitting power of the pilot signal, is reduced.

When the total transmitting power does not exceed the first predetermined value as determined in the comparator 107, the total transmitting power is compared with a second predetermined value which is lower than the first predetermined value (step A-4). For example, the second predetermined value may represent a minimum transmitting power of the base station or close thereto (but not a value below the minimum transmitting power since mobile stations at edges of the cell would not be able to receive the signal). Thus, in the exemplary system, the second predetermined value may be 20 watts.

When the total transmitting power does not exceed the second predetermined value, the signal for increasing the transmitting power assigned to the pilot signal of the relevant base station is supplied to the pilot signal transmitting power controller 102 (step A-5).

Thus, according to the first transmitting power control method of the present invention, the total transmitting power is monitored and compared with the predetermined value. When the total transmitting power is detected to exceed the predetermined value as a result of comparison, the transmitting power of the pilot signal is reduced for the system utilizing the pilot signal. Thus, the transmitting power assigned to the communication channel can be controlled within predetermined limits.

The number of mobile stations which terminate communication increases because the desired receiving wave power vs. noise power ratio (including the interference wave) of the pilot signal becomes lower than T_DROP. Meanwhile, the number of mobile stations which start communication also decreases because the desired receiving wave power vs. noise power ratio (including the interference wave) of the pilot signal becomes lower than T_ADD. Since the number of mobile stations under communication with the relevant base station is reduced, the forward channels used decreases when the transmitting power of the pilot signal is decreased.

Second Embodiment

Figure 3:
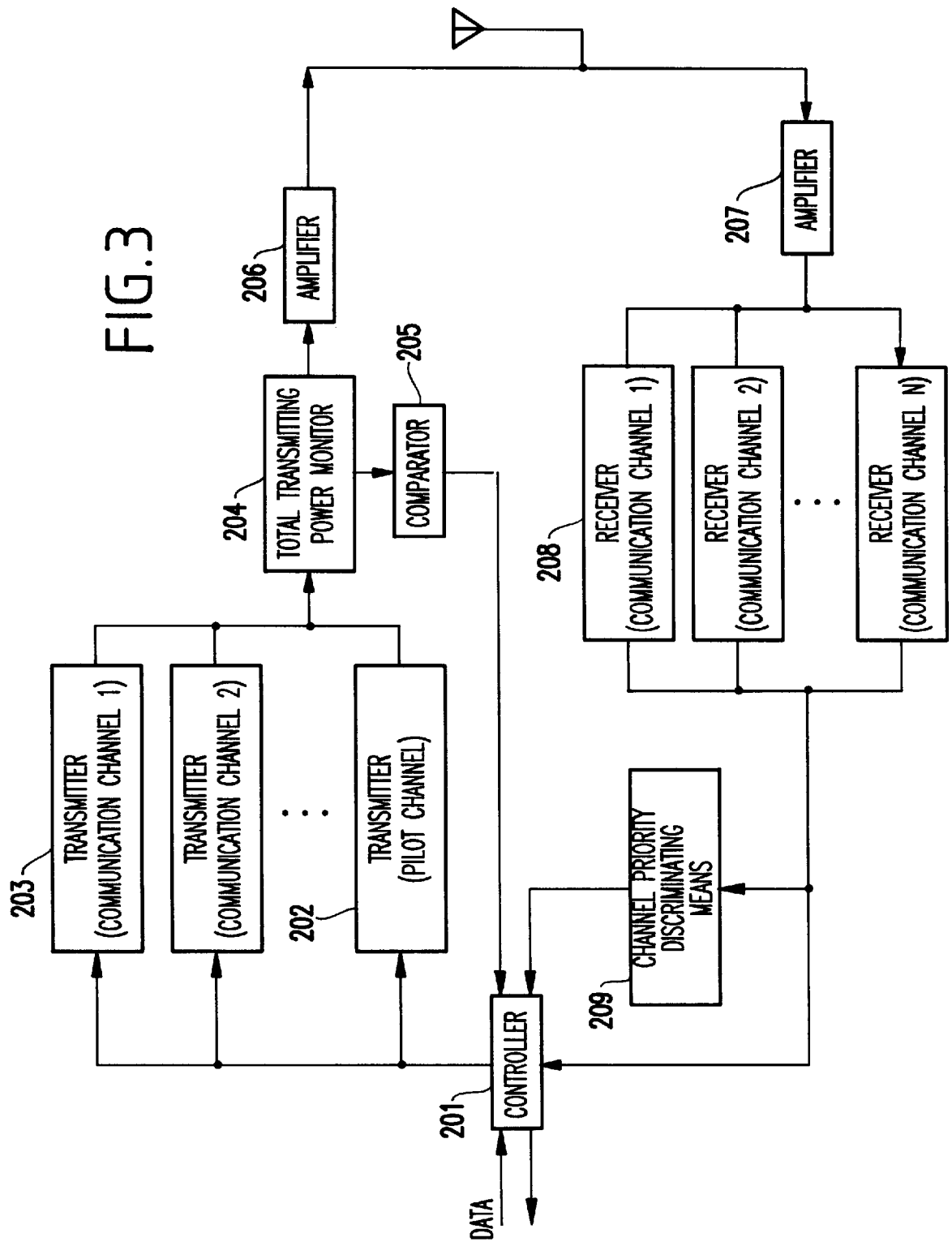
FIG. 3 is a block diagram of a base station to which the second embodiment of the transmitting power control method of the present invention is applied.

Referring to FIG. 3, a block diagram of the base station is shown to which the second embodiment of the transmitting power control method of the present invention is applied.

Data is input to and output from a controller 201. A signal from the controller 201 is inputted to the transmitter 203 for a communication channel(s) 1–N (where N is an integer) and the transmitter 202 for a pilot signal. A sum of the signals from the transmitters 202 and 203 is supplied to the total transmitting power monitor 204, and then is outputted to the antenna via the amplifier 206. The comparator 205 compares the monitoring result output from the total transmitting power monitor 204 with a third predetermined value (which will be described below). This comparison result is transferred to the controller 201.

On the receiving side, the signal received through the antenna (unreferenced) and amplified by amplifier 207 is inputted to the receiver 208 for a communication channel. Based on an output of the receiver 208, the channel priority discriminating means 209 discriminates the priority sequence for disconnecting the channel, and sends the result to the controller 201.

Figure 4:
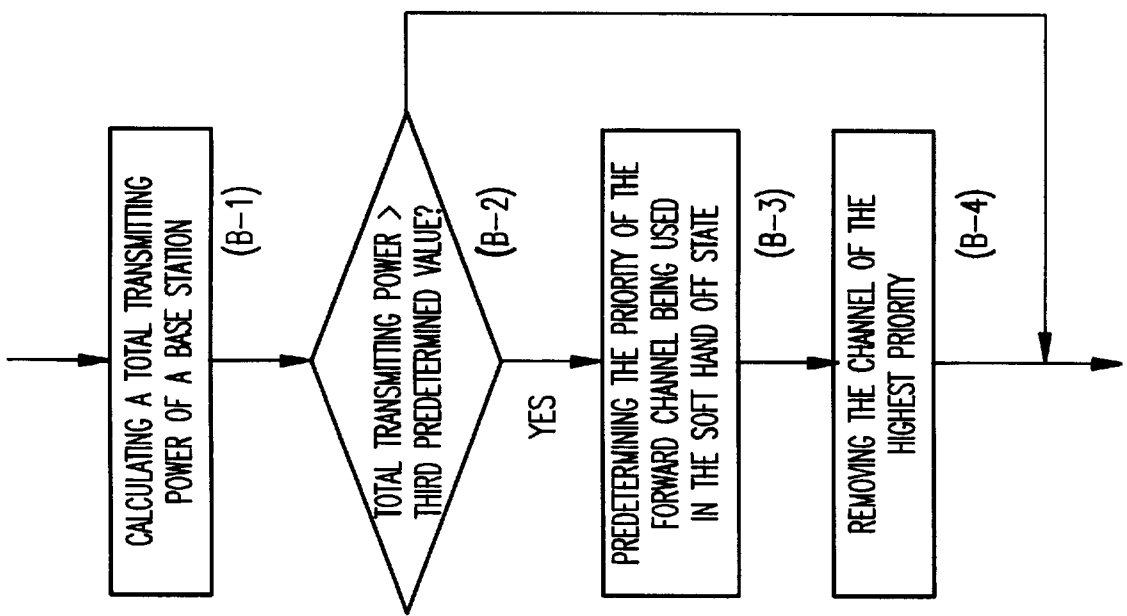
FIG. 4 is a flowchart of the second embodiment of the transmitting power control method of the present invention.

Hereinbelow, the second preferred embodiment is described with reference to FIG. 3 and the flowchart of the second embodiment of the transmitting power control method as shown in FIG. 4.

First, in step B-1 of FIG. 4, the total transmitting power is calculated in the total transmitting power monitor 204 based on the signal representing the sum of all transmitters in the base station. In step B-2, the comparator 205 compares the calculation result with the third predetermined value. For example, the third predetermined value represents a value which may be the same as the first predetermined value (e.g., 30 watts), and which is less than the base station's maximum transmitting power.

Thereafter, the channel priority discriminating means 209 determines a disconnection priority for the forward channel in which the base station is used currently in the "soft hand-off" state (B-3). In this embodiment, the "priority" is based on the amount of influence disconnecting the channel would have on the mobile station. Discrimination is made such that the smaller the influence is, the higher the priority for disconnection of the channel. For purposes of this application, "influence" means an amount of deterioration of the receiving signal quality when the one channel in a soft hand-off state is disconnected.

For example, the mobile station in the soft hand-off state supplies the information about the receiving power of the pilot signal from all base stations as the communication object to the base station using the reverse (e.g., communication to the base station from the mobile station) channel.

The channel priority discriminating means 209 discriminates priority based on the receiving power information, and supplies the discrimination result to the controller 201. For example, a mobile station in a soft hand-off state supplies information about the receiving power of the pilot signal from all base stations as the communication object, to the base station using the reverse channel (e.g., communication to the base station from the mobile station). The channel priority discriminating means 209 discriminates priority based on the receiving power information, and the priority information is provided to the controller 201. For example, the priority of the mobile station having a lower receiving power than the pilot signal, is increased.

When the mobile station is in the soft hand-off state between base stations A and B, the quality of the receiving signal is measured in each base station, and the base station having the best quality signal is selected. If the signal quality of base station A is better than that of base station B, the transmitting power of the mobile station is controlled depending on the strength of the receiving signal at the base station A and independently of the strength of the receiving signal of base station B. The forward channel from the base station A to the mobile station is set to have a lower priority than the channel from the base station B to the mobile station.

Alternatively, priority may be discriminated by the channel priority discriminating means 209 based on enhancing the priority of the mobile station which cannot transmit the transmitting power required. In other words, the channel priority discriminating means 209 may discriminate based on the receiving power of the reverse communication channel from the mobile station in the soft hand-off state and increase priority for disconnection for those mobile stations which cannot transmit the power required by the base station even when the reverse transmitting power is controlled. The purpose of the reverse transmitting power control is reducing the interference of receiving power from the unwanted mobile stations that are closer. The discrimination result is applied to the controller 201.

When the total transmitting power is detected to exceed the third predetermined value as a result of comparison in the step B-2 in the comparator 205, the comparator 205 provides a signal for requesting disconnection of the channel having the highest priority to the controller 201.

Upon reception of the disconnection request signal, the controller 201 sequentially disconnects the channels having the highest priority discriminated by the channel priority discriminating means 209 (step B-4). The number of forward channels used can be reduced by disconnecting the channel providing the least influence on the mobile station.

Thus, according to the second transmitting power control method of the present invention, when the total transmitting power of the base station exceeds the predetermined value, the priority for disconnecting the channel used by the mobile station in the soft hand-off state is determined.

Moreover, since the mobile station in the soft hand-off state is simultaneously communicating with two or more base stations, communication can be continued even when communication with one of the base stations is disconnected. A channel having a relatively lower receiving power in the mobile station is given the higher priority, and the channels are disconnected in the sequence of this priority. Thus, the number of forward channels used is decreased.

Third Embodiment

Figure 5:
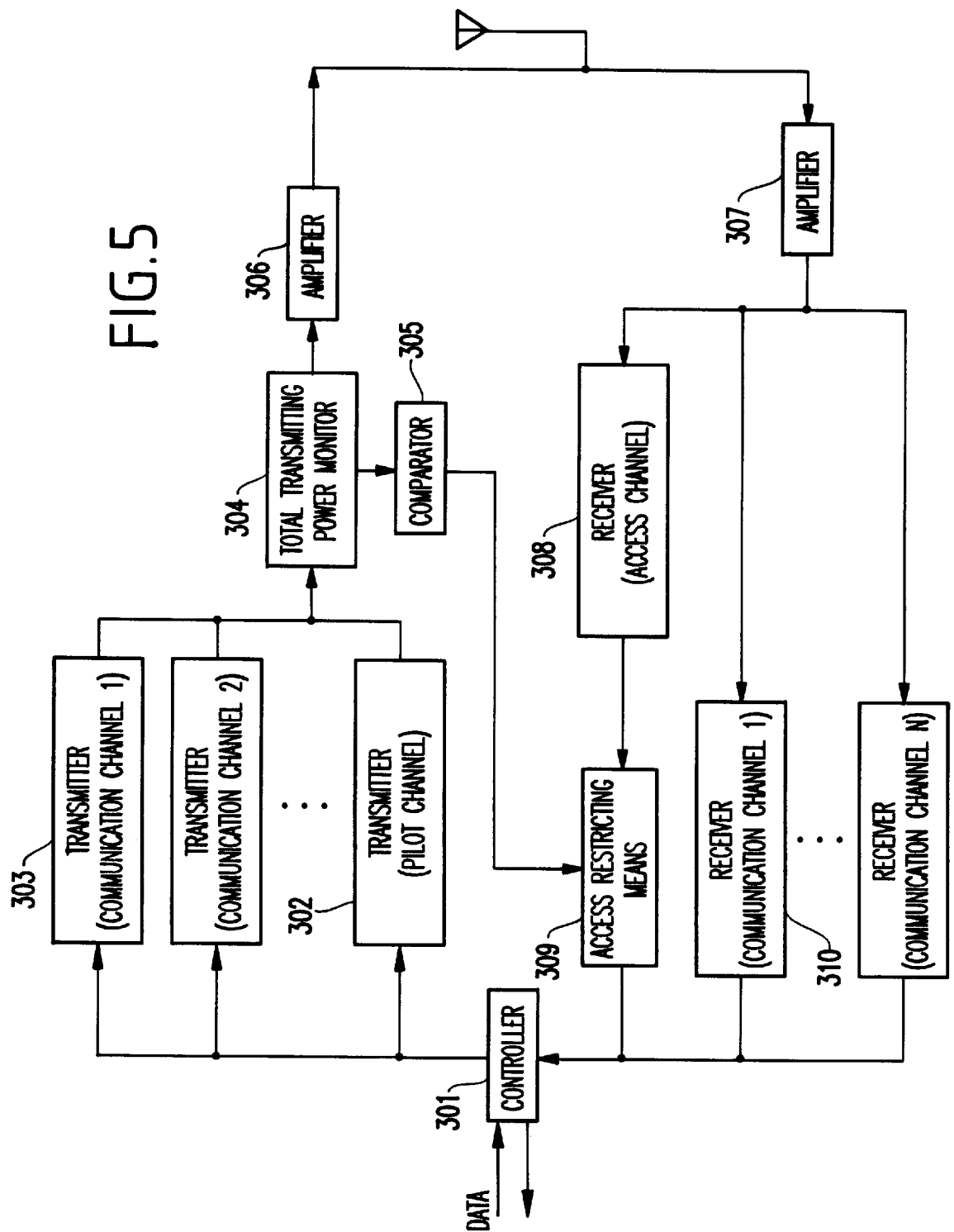
FIG. 5 is a block diagram of a base station to which the third embodiment of the transmitting power control method of the present invention is applied.

FIG. 5 is a block diagram of a base station to which the third embodiment of the transmitting power control method of the present invention is applied.

Data is input to and output from a controller 301. Signals output from the controller 301 are inputted to transmitters 303 for communication channels (1–N, where N is an integer) and a transmitter 302 is input with a pilot signal. A signal representing a sum of the signals from the transmitters 302, 303 is supplied to the total transmitting power monitor 304, and then is outputted to the antenna (unreferenced) via the amplifier 306.

A comparator 305 compares the output (e.g., monitoring result) of the total transmitting power monitor 304 with the fourth predetermined value explained below. For example, the fourth predetermined value may represent a value the same as the first predetermined value (e.g., 30 watts, which is less than the base station's maximum transmitting power). This comparison result is transferred to the access restricting (e.g., regulating) means 309.

On the receiving side, the receiving signal obtained via the antenna (unreferenced) and amplifier 307 is inputted to the receiver 310 for a communication channel and the receiver 308 for an access channel. A calling signal from a mobile station is inputted to the receiver 308 for an access channel. The access restricting means 309 regulates access to the controller 301 (and thereby communication) based on the output (e.g., the comparison result) in the comparator 305.

Figure 6:
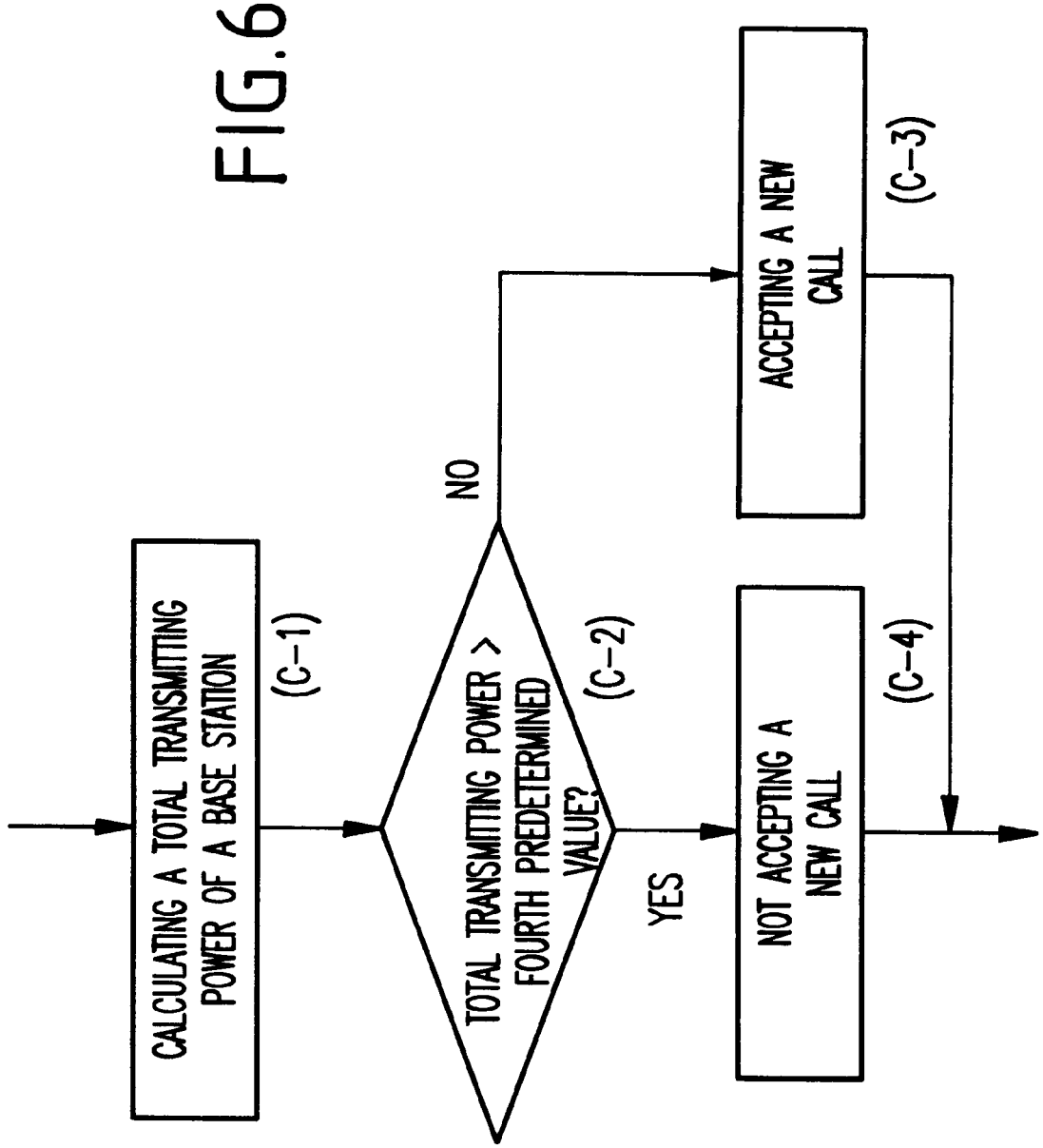
FIG. 6 is a flowchart of the third embodiment of the transmitting power control method of the present invention.

Hereinbelow, the operations of the third embodiment will be explained with reference to FIG. 5 and the flowchart of the transmitting power control method as shown in FIG. 6.

First, in step C-1, a total transmitting power is calculated in the total transmitting power monitor 304 based on the sum of inputs thereto from all transmitters (e.g., transmitters 302 and 303) of the base stations. In step C-2, the comparator 305 compares this calculation result with a fourth predetermined value. As mentioned above, the fourth predetermined value represents a value which may be the same as the first predetermined value discussed above.

In step C-3, if the receiver 308 receives a (new) calling signal from a mobile station, then this new call is accepted when the total transmitting power is detected not to exceed the fourth predetermined value based on the output from the comparator 305.

However, when the total transmitting power is detected to exceed the fourth predetermined value, the call is not accepted (and the access regulation request signal is not given to the controller 301 from the access restricting means 309). Therefore, the increase of the total transmitting power in the base station can be controlled by regulating the number of new calls accepted.

Thus, according to the third transmitting power control method of the present invention, when the total transmitting power of the base station exceeds a predetermined value, a new call is not accepted by this base station. Hence, an increase in the number of forward channels used can be controlled.

Fourth Embodiment

Figure 7:
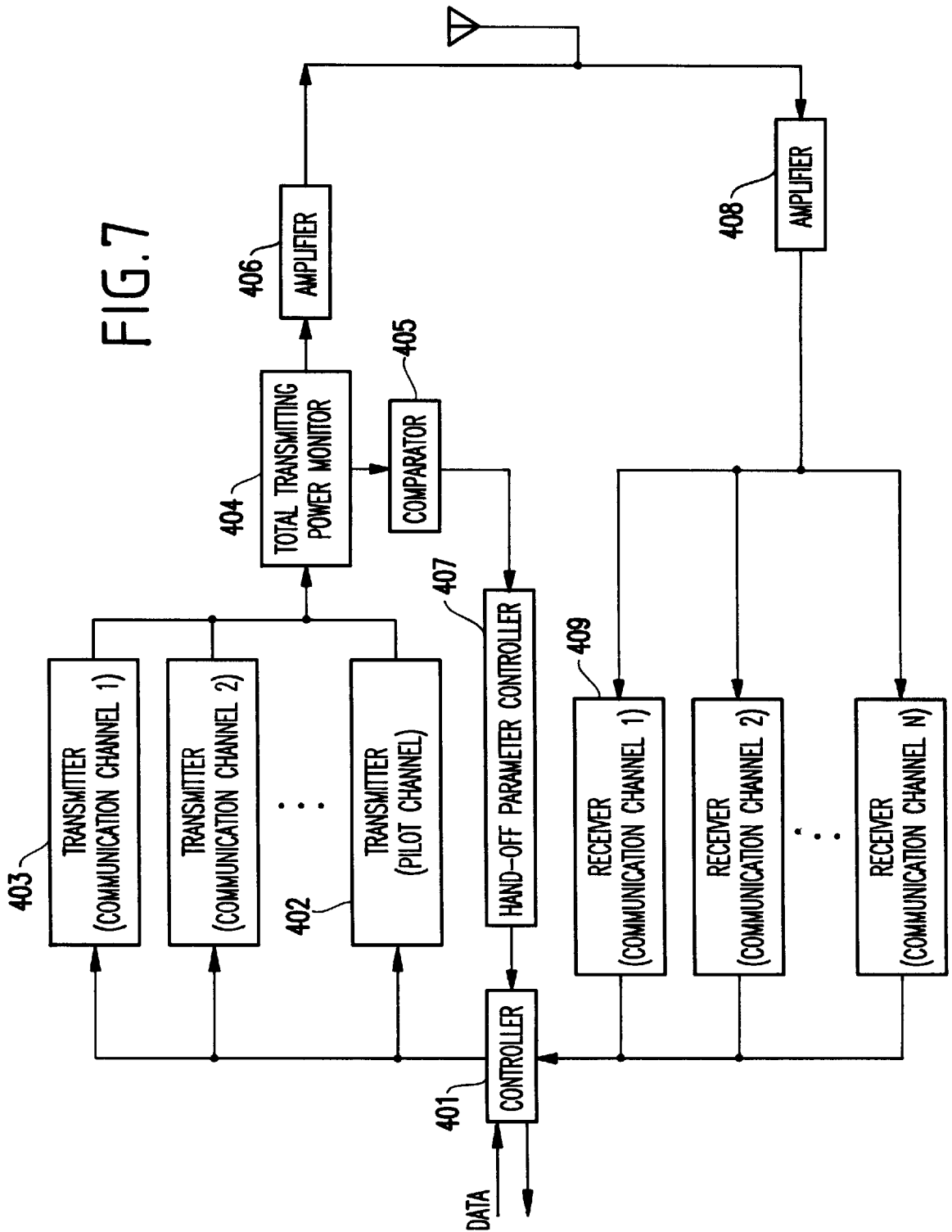
FIG. 7 is a block diagram of a base station to which the fourth embodiment of the transmitting power control method of the present invention is applied.

FIG. 7 is a block diagram of the base station to which the fourth embodiment of the transmitting power control method of the present invention is applied.

In FIG. 7, data is input to and output from a controller 401. To transmit a signal, signals from the controller 401 are inputted to transmitters 403 for communication channels (1–N, where N is an integer). A transmitter 402 is for a pilot signal. The signals from the transmitters 402, 403 are summed and the sum signal is input to a transmitting power monitor 404. The signal in turn is outputted to an antenna (unreferenced) through the amplifier 406.

The comparator 405 compares the output (e.g., the monitoring result) of the total transmitting power monitor 404 with a fifth predetermined value or a sixth predetermined value, explained in more detail below. Briefly, for example, the fifth and sixth predetermined values may represent values the same as the first and second predetermined values. In an exemplary system, the fifth predetermined value may be 30 watts and the sixth predetermined value may be 20 watts. This comparison result is transferred to a hand-off parameter controller 407, which provides an input to the controller 401.

On the receiving side, a signal is received through the antenna and amplified by the amplifier 408, and thereafter is inputted to the receiver(s) 409 for a communication channel (s) (1–N, wherein N is an integer).

Figure 8:
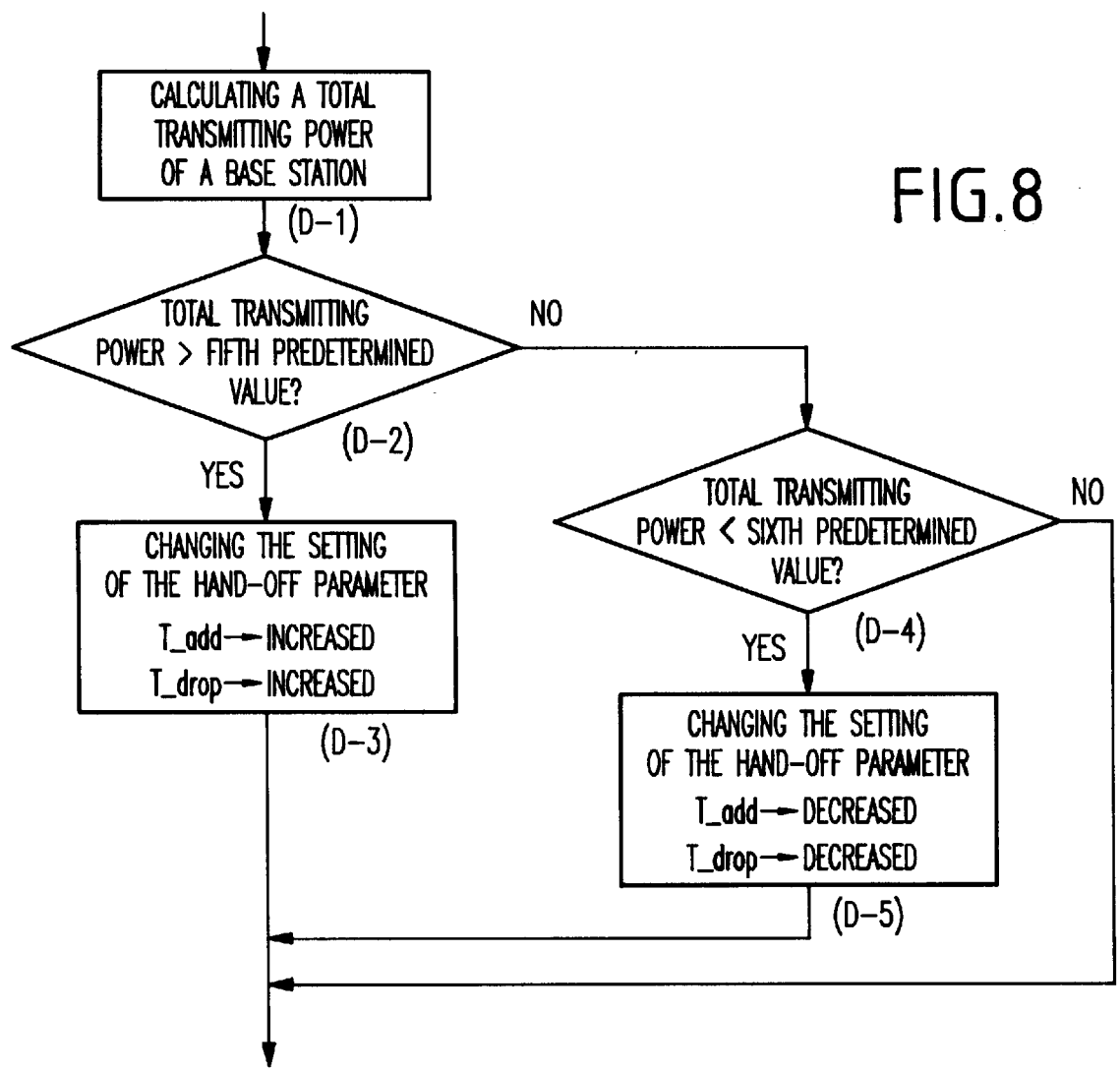
FIG. 8 is a flowchart of the fourth embodiment of the transmitting power control method of the present invention.
Figure 9:
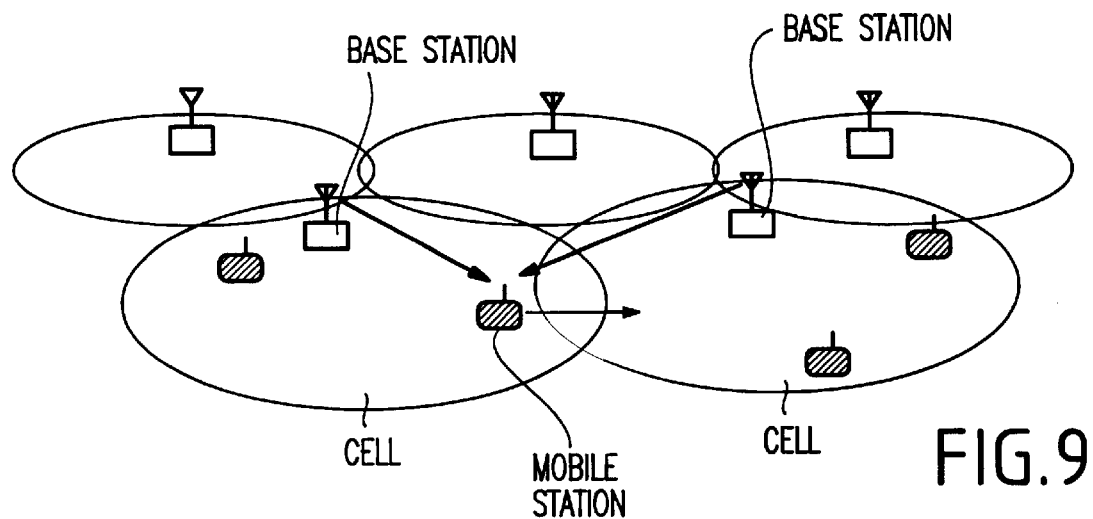
FIG. 9 is a diagram for explaining a cellular-type mobile communication system.

Next, operations of the fourth embodiment will be explained referring to FIG. 7 and the flowchart of FIG. 8 showing the fourth embodiment of the transmitting power control method of the present invention.

First, in step D-1, the total transmitting power of the base station is calculated in the total transmitting power monitor 404 based on the result of addition of the outputs of all transmitters of the base station.

Thereafter, in step D-2, the comparator 405 compares the total transmitting power as the calculation result with a fifth predetermined value. When the total transmitting power is detected not to exceed the fifth predetermined value as a result of comparison in step D-2, in step D-4 the comparator 405 compares the total transmitting power with a sixth predetermined value. As mentioned above, the fifth predetermined value is higher than the sixth predetermined value.

This comparison result is transferred to the hand-off parameter controller 407. The hand-off parameter controller 407 controls the hand-off parameter (e.g., T_ADD and T_DROP) based on the comparison result in the comparator 405. The parameter T_ADD (which may be a predetermined value) is the reference value for starting communication with a new base station, and starts the communication with the base station in which Ec/Io of the receiving pilot signal exceeds the parameter T_ADD. The parameter T_DROP (which may be a predetermined value) is the reference value for disconnecting communication with the base station under communication, and disconnects communication with the base station when Ec/Io of the pilot signal received in the mobile station does not exceed the parameter T_DROP.

When the total transmitting power is detected to exceed the fifth predetermined value as a result of comparison in the comparator 405 in step D-3, the hand-off parameter controller 407 applies the hand-off parameter increasing request signal to the controller 401. The hand-off parameter, after being changed, is transferred to the mobile station using the forward channel. A reason why increasing the hand-off parameter causes the mobile stations to switch to another base station is that when the T_DROP of the base station A increases, the mobile stations communicating with the base station A are easily disconnected from communication with base station A. Specifically, the Ec/Io of the receiving pilot signal from the base station A is easily less than T_DROP. Generally, the Ec/Io (receiving wave power/noise power) of the pilot signal increases as it gets closer to a base station.

When the T_ADD of the base station A increases, the mobile stations not communicating with the base station A have difficulty establishing communication with the base station A. This is because the Ec/Io of the receiving pilot signal from the base station A has difficulty exceeding the T_ADD.

Since the number of mobile stations for newly starting communication with the relevant base station decreases and the number of base stations for disconnecting communication with the relevant base station increases by enhancing the hand-off parameter, the number of forward channels used decreases.

Meanwhile, when the total transmitting power does not exceed the fifth predetermined value and moreover the sixth predetermined value (e.g., a "NO" in step D-3 and a "YES" in step D-4), the hand-off parameter controller 407 issues the hand-off parameter reducing request signal to the controller 401 in step D-5.

Therefore, when the total transmitting power exceeds the fifth predetermined value, the hand-off parameter is increased, while when the total transmitting power is less than the sixth predetermined value, the hand-off parameter is decreased to allow more mobile stations to remain in contact with the base station.

Thus, according to the fourth transmitting power control method of the present invention, when the total transmitting power of the base station exceeds the fifth predetermined value, the hand-off parameter is increased. When the T_ADD is increased, the number of mobile stations which select the base station as the communication object decreases. When the T_DROP is increased, the number of mobile stations which disconnect from (e.g., terminate) communication with the base station increases. It is noted that normally, the values of T_ADD and T_DROP are predetermined for each mobile station. However, these values may be varied, independently of each base station, and selectively controlled based on base station conditions (e.g., size of the cells, maximum transmitting power, obstructions, terrain, buildings, etc.). Thus, the number of forward channels used decreases when the hand-off parameter increases.

As explained previously, according to the present invention, the total transmitting power in the base station will not reach the maximum transmitting power, even when the number of mobile stations increases, and the transmitting power can be assigned to the forward channel by individually controlling the transmitting power to each mobile station and moreover by monitoring the total transmitting power in the base station.

While the invention has been described in terms of several preferred embodiments, those skilled in the art will recognize that the invention can be practiced with modification within the spirit and scope of the appended claims.

Having thus described my invention, what I claim as new and desire to secure by Letters Patent is as follows:

1. A method of controlling a transmitting power of a base station of a mobile communication system for radio communication between said base station and a mobile station on a channel and for transmitting a pilot signal by said base station, said method comprising:

monitoring, at said base station, a total transmitting power of said base station;

comparing said total transmitting power with a predetermined value; and controlling a transmitting power of said pilot signal based on said comparing.

2. A method as in claim 1, wherein said channel comprises a code-division-multiplexed communication channel, and said pilot signal comprises a code-division-multiplexed pilot signal, and wherein said controlling comprises reducing a transmitting power of said pilot signal when said total transmitting power exceeds said first predetermined value.

3. A method as in claim 2, further comprising:

comparing said total transmitting power with a second predetermined value when said total transmitting power does not exceed said first predetermined value, said second predetermined value being less than said first predetermined value; and increasing said transmitting power of said pilot signal when said total transmitting power does not exceed said second predetermined value.

4. A method of controlling a transmitting power of a base station of a mobile communication system for radio communication between said base station and a mobile station on a communication channel, said method comprising:

monitoring, at said base station, a total transmitting power of said base station;

comparing said total transmitting power with a predetermined value;

discriminating priority for disconnection of said channel depending upon a characteristic of said mobile station; and disconnecting said channel based on said comparing and said discriminating priority.

5. A method as in claim 4, wherein said channel comprises a code-division-multiplexed communication channel, and wherein said disconnecting disconnects said channel based on said priority and when said total transmitting power exceeds said predetermined value.

6. A method of controlling a transmitting power of a base station according to claim 4, wherein said discriminating determines said priority for said channel based on a characteristic of said mobile station, said characteristic comprising a receiving power of a pilot signal from said base station.

7. A method of controlling a transmitting power of a base station of a mobile communication system for radio communication between said base station and a mobile station on a communication channel, said method comprising:

monitoring, at said base station, a total transmitting power of said base station;

comparing said total transmitting power with a predetermined value; and restricting access to said base station by said mobile station based on said comparing.

8. A method as in claim 7, wherein said channel comprises a code-division-multiplexed communication channel, and wherein said restricting allows additional mobile stations to access said base station when said total transmitting power is less than said predetermined value.

9. A method of controlling a transmitting power of a base station of a mobile communication system for radio communication between said base station and a mobile station on a communication channel and for transmitting a pilot signal by said base station, said method comprising:

determining a receiving-wave-power to noise-power ratio and selecting from a base station among a plurality of base stations when said ratio exceeds a reference value;

monitoring, at said base station, a total transmitting power of said base station;

comparing said total transmitting power of said base station with a first predetermined value; and controlling said reference value based on said comparing.

10. A method as in claim 9, wherein said channel comprises a code-division-multiplexed communication channel, and said pilot signal comprises a code-division-multiplexed pilot signal, and wherein said controlling increases said reference value when said total transmitting power exceeds said first predetermined value.

11. A method of controlling a transmitting power of a base station according to claim 10, further comprising:

comparing said total transmitting power with a second predetermined value, wherein said second predetermined value is less than said first predetermined value; and decreasing said reference value when said total transmitting power does not exceed said second predetermined value.

12. A method of controlling a transmitting power of a base station according to claim 9, wherein said controlling comprises controlling a hand-off parameter of a mobile station.

13. A code-division-multiple-access (CDMA) system, comprising:

a plurality of base stations; and a plurality of mobile stations, each for communicating with at least one base station of said plurality of base stations, wherein a base station of said at least one base station includes means for monitoring a total transmitting power of said base station, and means for limiting a total transmission power thereof by restricting a number of said mobile stations in communication with said base station.

14. A system as in claim 13, wherein said base stations transmit a first signal to said mobile stations,
said mobile stations selecting said base station from said base stations based on a characteristic of said first signal, and
said transmission power limiting means decreasing said first signal when said transmission power exceeds a predetermined value.

15. A system as in claim 13, wherein said transmission power limiting means assigns respective priority values to said mobile stations in communication with said base station, and
wherein, when said transmission power exceeds a predetermined value, said transmission power limiting means disconnects said mobile stations based on said priority values.

16. A system as in claim 15, wherein said priority values are based on said mobile stations being in connection with more than one base station and a characteristic of a signal transmitted by said mobile stations to said base stations.

17. A system as in claim 13, wherein said transmission power limiting means restricts additional mobile stations of said mobile stations from communicating with said base station when said transmission power exceeds a predetermined value.

18. A system as in claim 13, wherein said transmission power limiting means controls said mobile stations to select a second base station different than said base station when said transmission power exceeds a predetermined value.

19. A system as in claim 18, wherein said mobile stations each include a hand-off value and said base station varies said hand-off value when said total transmission power exceeds a predetermined value.

20. A system as in claim 13, wherein said mobile stations each include a hand-off value and said base station varies said hand-off value when said total transmission power exceeds a predetermined value.

21. A code-division-multiple-access (CDMA) system, comprising:
a plurality of base stations; and
a plurality of mobile stations, each for communicating with at least one base station of said plurality of base stations,
wherein a base station of said at least one base station includes means for limiting a transmission power thereof by restricting a number of said mobile stations in communication with said base station,
wherein said mobile stations each include a hand-off value and said base station varies said hand-off value when said total transmission power exceeds a predetermined value,
wherein said hand-off value includes first and second reference values, and
wherein when said total transmission power exceeds a predetermined value said first and second reference values are increased.

22. A system as in claim 13, said base station further including means for detecting whether said total transmission power exceeds a predetermined value,
wherein when said detecting means detects that said total transmission power does not exceed said predetermined value, said detecting means determines whether said total transmission power exceeds a second predetermined value.

23. A code-division-multiple-access (CDMA) system, comprising:
a plurality of base stations; and
a plurality of mobile stations, each for communicating with at least one base station of said plurality of base stations,
wherein a base station of said at least one base station includes:
means for limiting a transmission power thereof by restricting a number of said mobile stations in communication with said base station; and
means for detecting whether said total transmission power exceeds a predetermined value, wherein when said detecting means detects that said total transmission power does not exceed a predetermined value, said detecting means determines whether said total transmission power exceeds a second predetermined value,
wherein said mobile stations each include a hand-off value associated therewith, said hand-off parameter including first and second reference values, and
wherein when said total transmission power does not exceed said second predetermined value, said first and second reference values are decreased.

24. A method of controlling a transmitting power of a base station of a mobile communication system for radio communication between said base station and a mobile station, said method comprising:
monitoring, by said base station, a total transmitting power of said base station;
comparing said total transmitting power with a first predetermined value; and
adjusting a hand-off parameter of said mobile station based on whether said total transmitting power exceeds said first predetermined value.

25. A method of controlling a transmitting power of a base station of a mobile communication system for radio communication between said base station and a mobile station, said method comprising:
monitoring a total transmitting power of said base station;
comparing said total transmitting power with a first predetermined value; and
adjusting a hand-off parameter of said mobile station based on whether said total transmitting power exceeds said first predetermined value,
wherein said hand-off parameter includes first and second reference components, and
wherein when said total transmitting power exceeds said first predetermined value, said first and second components are increased.

26. A method of controlling a transmitting power of a base station of a mobile communication system for radio communication between said base station and a mobile station, said method comprising:
monitoring a total transmitting power of said base station;
comparing said total transmitting power with a first predetermined value;
adjusting a hand-off parameter of said mobile station based on whether said total transmitting power exceeds said first predetermined value; and
when said total transmission power does not exceed a predetermined value, determining whether said total transmission power is less than a second predetermined value.

27. A method according to claim 26, said hand-off parameter including first and second components, said method further comprising:

when said total transmitting power is less than said second predetermined value, decreasing said first and second components.

28. A method according to claim 27, wherein said first component of said hand-off parameter comprises a value for suspending communication with the base station as a current object of communication and said second component comprises a value for newly starting communication with the base station.

29. The method according to claim 1, wherein said monitoring is performed at a transmitting end of said base station.

30. The method according to claim 4, wherein said monitoring is performed at a transmitting end of said base station.

31. The method according to claim 7, wherein said monitoring is performed at a transmitting end of said base station.

32. The method according to claim 9, wherein said monitoring is performed at a transmitting end of said base station.

33. The system according to claim 13, wherein said monitoring means performs said monitoring at a transmitting end of said base station.

34. The method according to claim 24, wherein said monitoring is performed at a transmitting end of said base station.

* * * * *